US008975873B2

(12) United States Patent
Tanaka

(10) Patent No.: US 8,975,873 B2
(45) Date of Patent: Mar. 10, 2015

(54) COMPOSITE DEVICE SYSTEM

(75) Inventor: Hidenori Tanaka, Tokyo (JP)

(73) Assignee: Mutsumi Electric Co., Ltd., Tokyo (JP)

( * ) Notice: Subject to any disclaimer, the term of this patent is extended or adjusted under 35 U.S.C. 154(b) by 447 days.

(21) Appl. No.: 13/371,534

(22) Filed: Feb. 13, 2012

(65) Prior Publication Data

US 2012/0212185 A1 Aug. 23, 2012

(30) Foreign Application Priority Data

Feb. 18, 2011 (JP) ................................ 2011-033795

(51) Int. Cl.
*H02J 7/00* (2006.01)

(52) U.S. Cl.
CPC ............ *H02J 7/0021* (2013.01); *H02J 7/0004* (2013.01)
USPC .......................................... 320/132; 327/540

(58) Field of Classification Search
USPC .......................................... 327/540; 320/132
See application file for complete search history.

(56) References Cited

U.S. PATENT DOCUMENTS 5,572,478 A * 11/1996 Sato et al. .................... 365/226
5,928,336 A * 7/1999 Takeuchi .......................... 710/1
6,879,517 B2 * 4/2005 Geren et al. ............ 365/185.01
7,336,978 B2 * 2/2008 Kim .............................. 455/574
8,184,488 B2 * 5/2012 May et al. ................ 365/189.09
2011/0267726 A1 11/2011 Ikeuchi et al.

FOREIGN PATENT DOCUMENTS

JP 2001-174534 6/2001
WO 2010/082608 7/2010

OTHER PUBLICATIONS

Chinese Office Action dated Nov. 4, 2014.

* cited by examiner

*Primary Examiner* — Edward Tso
*Assistant Examiner* — Ramy Ramadan
(74) *Attorney, Agent, or Firm* — IPUSA, PLLC

(57) ABSTRACT

A composite device system including: a first device including a nonvolatile memory; and a second device configured to supply a power to the first device, the second device including: a power supply circuit configured to stabilize a first power supplied from an external part into a second power lower than the first power, and to supply the second power to the first device; a communication circuit configured to receive control data from the first device; and a switch configured to switch between on and off based on the control data, and to supply the first power to the first device when the switch is on, wherein the second device receives the control data from the first device by the communication circuit when data is written into the nonvolatile memory so that the switch is turned on and the first power is supplied to the first device.

3 Claims, 5 Drawing Sheets

3
VDD
VREGOUT
3a
REGULATOR
1
VDD
1c
BOOSTER CIRCUIT
1a
FLASH ROM
1b
MICRO-COMPUTER
2
SECONDARY BATTERY

COMPOSITE DEVICE SYSTEM

CROSS-REFERENCE TO RELATED APPLICATION

The present application is based upon and claims the benefit of priority of Japanese Patent Application No. 2011-033795, filed on Feb. 18, 2011, the entire contents of which are incorporated herein by reference.

BACKGROUND OF THE INVENTION

1. Field of the Invention

The present invention relates to a composite device system in which a first device and a second device are connected.

2. Description of the Related Art

In recent years, many portable apparatuses such as digital cameras have a lithium-ion battery. In general, it is difficult to detect a battery remaining amount using the battery voltage. Therefore, the battery remaining amount is measured by accumulating charge-discharge currents of the battery (refer to Japanese Laid-Open Patent Application No. 2001-174534). Also, a typical lithium-ion battery is vulnerable to over-charging and over-discharging. As such, it is necessary to protect such a lithium-ion battery from over-charging and over-discharging. Thus, the lithium-ion battery is used as a form of a battery pack including a battery monitor IC (Integrated Circuit) for monitoring the battery remaining amount and a protection IC for protecting from over-charging and over-discharging.

In a conventional battery pack including a battery monitor IC and a protection IC, the battery monitor IC includes a booster circuit for boosting a supplied voltage into a higher voltage. But, there is a problem in that a chip area of such a booster circuit becomes large in the battery monitor IC.

SUMMARY OF THE INVENTION

Accordingly, the present invention is conceived in view of the above-mentioned problem, and an object of the present invention is to provide a composite device system that can decrease a size of a booster circuit in a device.

According to an embodiment, there is provided a composite device system including:

a first device including a nonvolatile memory that is rewritable; and a second device, connected to the first device, configured to supply a power to the first device, the second device including:

a power supply circuit configured to stabilize a first power supplied from an external part into a second power that is lower than the first power, and to supply the second power to the first device;

a communication circuit configured to receive control data sent from the first device; and a switch configured to switch between on and off based on the control data, and to supply the first power supplied from the external part to the first device when the switch is on, wherein the second device receives the control data from the first device by the communication circuit when data is written into the nonvolatile memory so that the switch is turned on and the first power is supplied to the first device.

Other objects and further features of the present invention will be apparent from the following detailed description when read in conjunction with the accompanying drawings.

DESCRIPTION OF THE PREFERRED EMBODIMENTS

Prior to describing an embodiment of the present invention, the problem will be described in more detail with reference to a figure for convenience of understanding.

Figure 1:
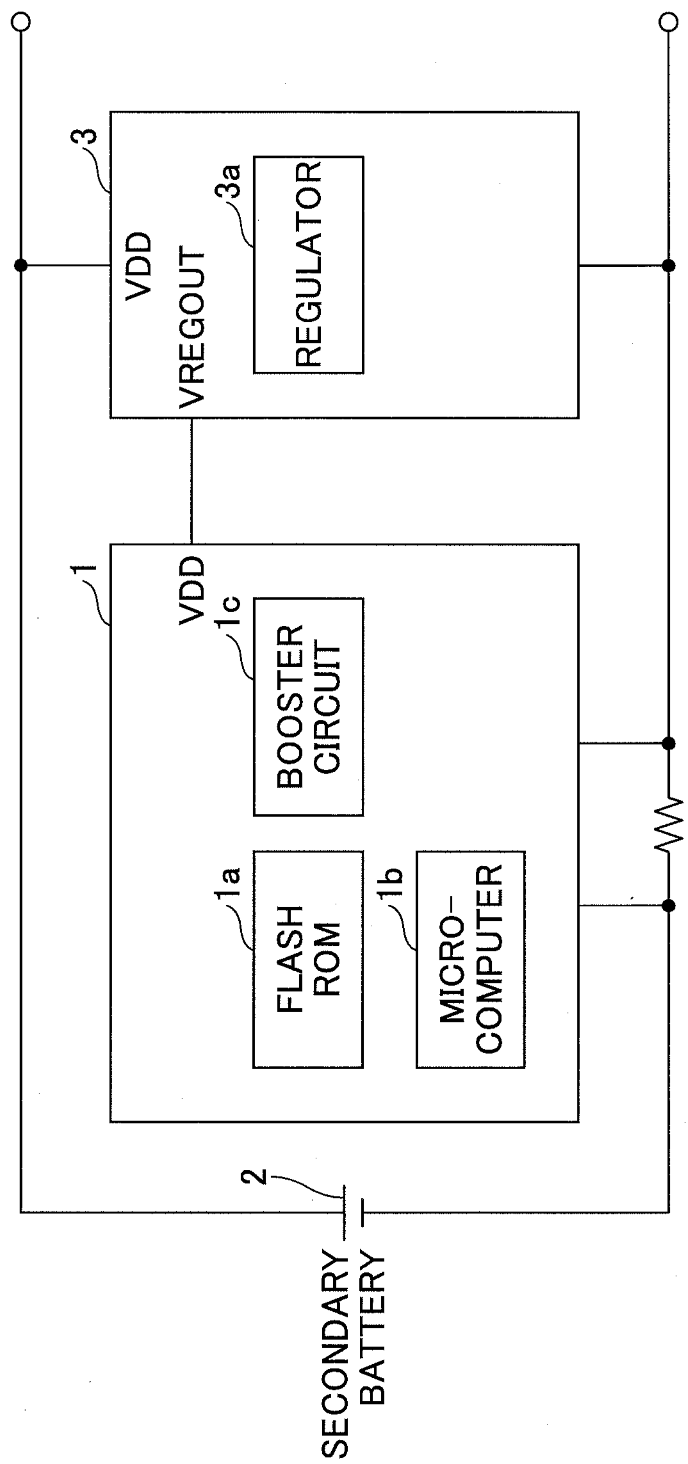
FIG. 1 is a block diagram showing an example of a battery pack.

FIG. 1 is a block diagram showing an example of a battery pack in a related art. In the battery pack shown in FIG. 1, a battery monitor IC 1 detects charge-discharge current of a secondary battery 2 such as a lithium-ion battery. Also, a terminal VDD of the battery monitor IC 1 is supplied with a stabilized power of a voltage of 1.8 V, for example, from a protection IC 3. The battery monitor IC 1 includes a flash ROM 1*a* and a microcomputer 1*b*, so that the battery monitor IC 1 accumulates the charge-discharge current of the secondary battery 2 to calculate a battery remaining amount of the secondary battery 2 by using the microcomputer 1*b*.

The protection IC 3 stabilizes a voltage of about 3.0 V~4.0 V, for example, supplied to the terminal VDD from the secondary battery 2 by using an embedded regulator 3*a*, and supplies the stabilized voltage to an internal circuit of the protection IC 3. Also, the protection IC 3 supplies a constant voltage of 1.8 V to the terminal VDD of the battery monitor IC 1 from the terminal VREGOUT.

As mentioned above, a power of the voltage of 1.8 V is supplied to the battery monitor IC 1 from the protection IC 3. The battery monitor IC 1 uses the power for operation. The battery monitor IC 1 includes a flash ROM 1*a* as a rewritable and nonvolatile memory. When there exists data that should be held even if power is cut off, the microcomputer 1*b* writes the data into the flash ROM 1*a*. Although the microcomputer 1*b* performs normal operation by using the voltage of 1.8 V, 5.0 V is necessary, for example, when writing data into the flash ROM 1*a*. Therefore, the battery monitor IC 1 is provided with a booster circuit 1*c* for boosting the voltage of 1.8 V supplied from the protection IC 3 at the terminal VDD into the voltage of 5.0 V.

Since the booster circuit 1*c* boosts the voltage of 1.8 V to the voltage of 5.0 V, the number of boosting stages of the booster circuit 1*c* increases so that the booster circuit 1*c* becomes large. Thus, there is a problem in that a chip area of the booster circuit 1*c* becomes large in the battery monitor IC 1.

In the following, an embodiment of the present invention to solve the above-mentioned problem is described with reference to figures.

<Outline of Embodiment>

According to an embodiment, there is provided a composite device system including:

a first device 11 including a nonvolatile memory 22 that is rewritable; and a second device 12, connected to the first device, configured to supply a power to the first device, the second device including:

a power supply circuit 33 configured to stabilize a first power supplied from an external part into a second power that is lower than the first power, and to supply the second power to the first device;

a communication circuit 31 configured to receive control data sent from the first device; and a switch 34 configured to switch between on and off based on the control data, and to supply the first power supplied from the external part to the first device when the switch is on, wherein the second device receives the control data from the first device by the communication circuit when data is written into the nonvolatile memory so that the switch is turned on and the first power is supplied to the first device.

The composite device system may include:

a microcomputer 21 configured to write data into the nonvolatile memory;

a communication circuit 23 configured to send control data output by the microcomputer to the second device; and a booster circuit 24 configured to boost the first power supplied from the switch of the second device so as to supply the boosted first power to the nonvolatile memory.

In the composite device system, the first device may be an integrated circuit configured to monitor a battery remaining amount of a secondary battery 10; and the second device may be an integrated circuit configured, at least, to protect the secondary battery from over-charging and over-discharging.

The above reference symbols are merely examples, and the embodiment described herein is not limited by the reference symbols shown in the figures.

According to the embodiment, the size of the booster circuit of the first device can be reduced.

<Configuration of Communication System>

Figure 2:
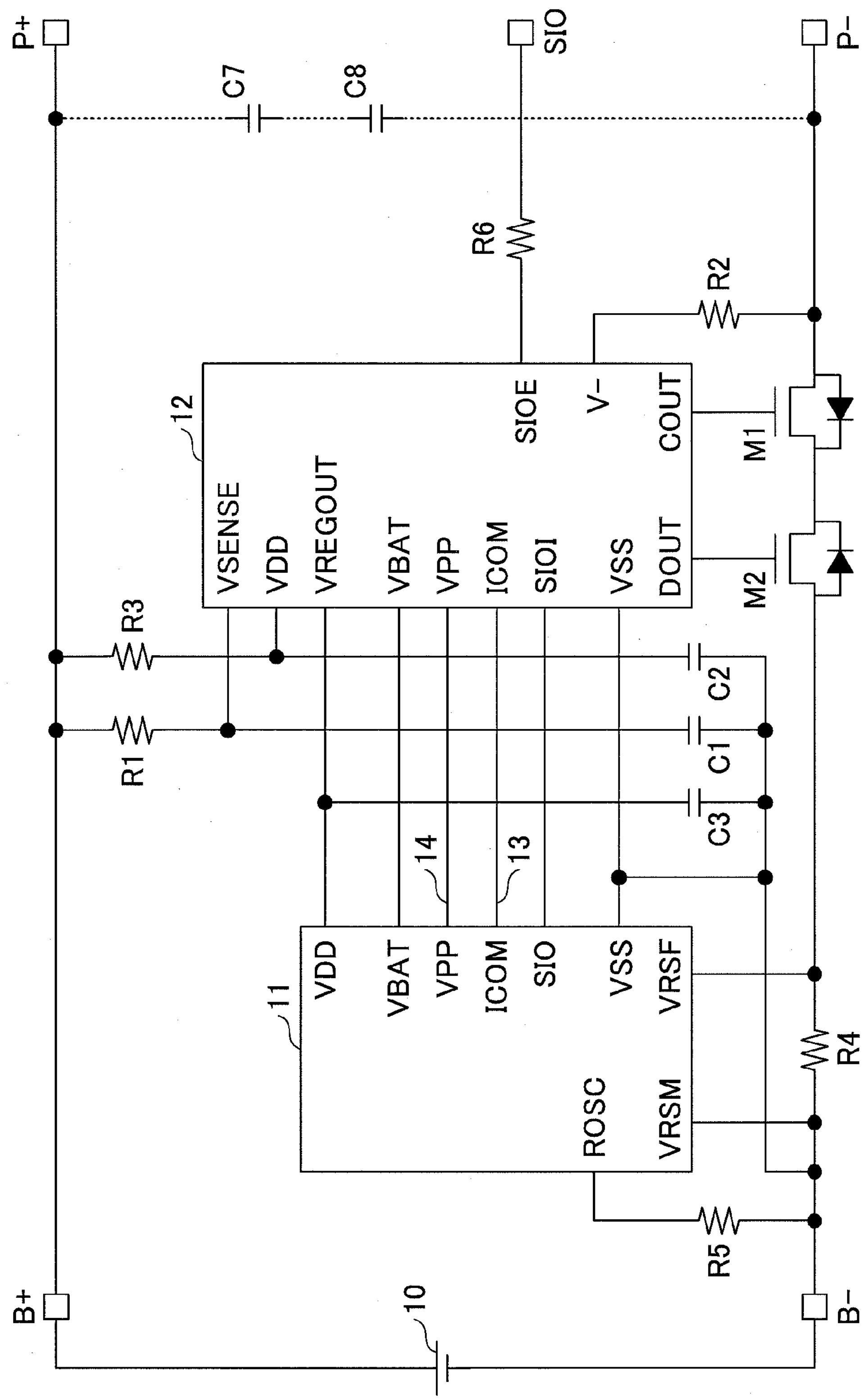
FIG. 2 is a block diagram showing an embodiment of a composite device system.

FIG. 2 is a block diagram showing a battery pack as an embodiment of the composite device system of the invention. The battery pack is a composite device system in which a battery monitor IC and a protection IC are connected.

As shown in FIG. 2, a secondary battery 10 such as a lithium-ion battery is connected between terminals B+ and B−. The terminal B+ is connected to a terminal P+, and the terminal B− is connected to a terminal P− via a resistor R4 and MOS transistors M2 and M1. A load or a charging circuit is connected between terminals P+ and P−.

Voltages of both sides of the resistor R4 are supplied to terminals VRSM and VRSF of a battery monitor IC (Integrated Circuit) 11, that is a first device, such that the battery monitor IC 11 detects a charge-discharge discharge current of the secondary battery 10 based on a voltage difference between the terminals VRSM and VRSF. Also, a battery voltage of the secondary battery 10 is supplied to a terminal VBAT via the protection IC 12, so that the battery monitor IC 11 detects the voltage of the terminal VBAT as a voltage of the secondary battery 10.

In addition, power that is stabilized by the protection IC 12 is supplied to the terminal VDD of the battery monitor IC 11. A terminal VPP of the battery monitor IC 11 is connected to a terminal VPP of the protection IC 12 via a power line 14. A microcomputer is embedded in the battery monitor IC 11 so that the battery monitor IC 11 calculates a battery remaining amount of the secondary battery 10 by accumulating charge-discharge currents of the secondary battery 10, and performs overvoltage detection and overcurrent detection in charge and discharge of the secondary battery 10, so as to control the protection IC 12 based on the detection result.

The protection IC 12 that is a second device stabilizes a voltage (3.0 V~4.0 V, for example) to be supplied to the terminal VDD from the secondary battery 10 via a resistor R3 into 1.8 V, for example, and supplies the stabilized voltage to the battery monitor IC 11 from the terminal VREGOUT. Also, the battery voltage of the secondary battery 10 is supplied to the terminal VSENSE via the resistor R1. The battery voltage is divided and supplied to the battery monitor IC 11 from the terminal VBAT. Also, only when an later-mentioned switch embedded in the protection IC 12 is turned on does the protection IC 12 supply a voltage supplied at the terminal VDD to the terminal VPP of the battery monitor IC 11 from the terminal VPP.

The protection IC 12 compares the voltage of the terminal VSENSE with an over-charging threshold and an over-discharging threshold. If the voltage of the terminal VSENSE exceeds the over-charging threshold, the protection IC 12 turns off the MOS transistor M1 as an abnormal state. If the voltage of the terminal VSENSE falls below the over-discharging threshold, the protection IC 12 turns off the MOS transistor M2 as an abnormal state. In addition to that, the protection IC 12 changes ON/OFF of the MOS transistors M1 and M2 according to control from the battery monitor IC 11 so as to perform charge-discharge control of the secondary battery 10.

The terminal ICOM of the battery monitor IC 11 and the terminal ICOM of the protection IC 12 are connected by a signal line 13, so that bidirectional three-value serial communication is performed between the battery monitor IC 11 and the protection IC 12, for example.

The battery monitor IC 11 includes a digital circuit such as the microcomputer. Thus, a withstand voltage against noise and the like is set to be low. On the other hand, the protection IC 12 is mostly configured by analog circuits, and a power is directly supplied from the secondary battery 10. Thus, the withstand voltage is set to be sufficiently high compared to that of the battery monitor IC 11.

<Block Configuration of Main Parts of the Battery Monitor IC and the Protection IC>

Figure 3:
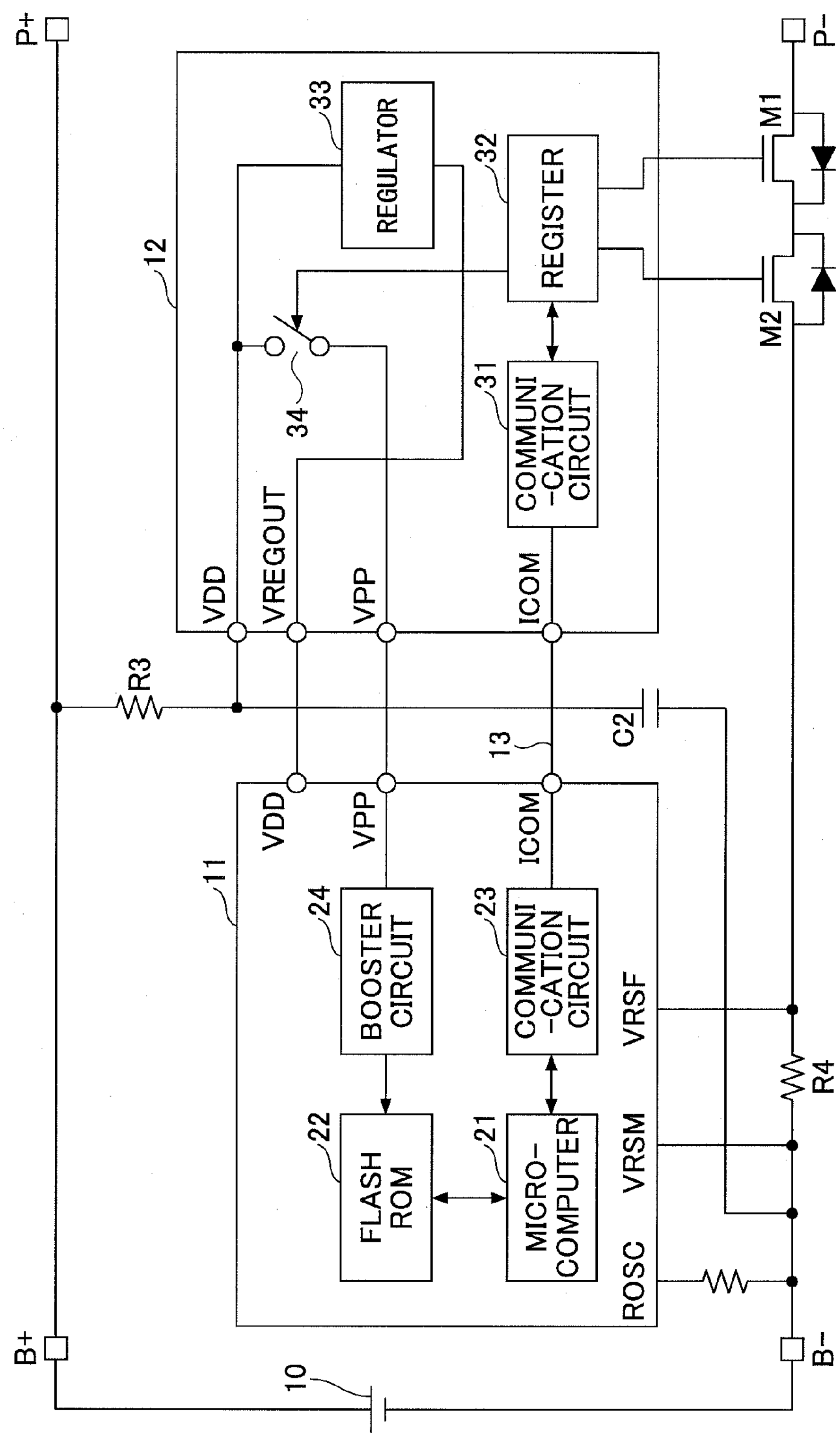
FIG. 3 is a block diagram showing an embodiment of main parts of a battery monitor IC and a protection IC.

FIG. 3 is a block diagram showing an embodiment of main parts of the battery monitor IC 11 and the protection IC 12. As shown in FIG. 3, the battery monitor IC 11 includes a microcomputer 21, a flash ROM 22, a communication circuit 23 and a booster circuit 24.

The microcomputer 21 includes an A/D converter, and memories such as a RAM and a ROM. The microcomputer 21 accumulates charge-discharge currents of the secondary battery 10 to calculate the battery remaining amount, and performs overvoltage detection and overcurrent detection in charge and discharge for the secondary battery 10. The microcomputer 21 writes data that should be stored and held even if the power is off into the flash ROM 22 that is a rewritable and nonvolatile memory, and reads the data stored in the flash ROM 22. Also, the microcomputer 21 transmits control data to the protection IC 12 via the communication circuit 23, and receives status data indicating a status of the protection IC 12. The control data includes MOS transistor control bits and a switch control bit. The MOS transistor control bits are for instructing ON/OFF of each of the MOS transistors M1 and M2 using values 1/0, and the switch control bit is for instructing ON/OFF of an later-mentioned feeding switch 34.

The communication circuit 23 performs transmission of control data and reception of status data between the communication circuit 23 and the communication circuit 31 of the protection IC 12 according to control by the microcomputer 21.

When a voltage of 3.0 V~4.0V, for example, is supplied to the terminal VPP, the booster circuit 24 boosts the supplied voltage into 5.0 V, for example, and supplies the voltage of 5.0 V to the flash ROM 22 as a writing voltage.

The protection IC 12 includes a communication circuit 31, a register 32, a regulator 33 and a feeding switch 34. The communication circuit 31 performs reception of control data and transmission of status data between the communication circuit 31 and the communication circuit 23 of the battery monitor IC 11. The communication circuit 31 stores the received control data into the register 32, and is supplied with status data stored in the register 32.

The regulator 33 stabilizes the voltage (3.0 V~4.0 V, for example) supplied from the secondary battery 10 at the terminal VDD into 1.8 V, for example, and supplies the stabilized voltage of 1.8 V to the battery monitor IC 11 from the terminal VREGOUT.

One end of the feeding switch 34 is connected to the terminal VDD, and another end of the feeding switch 34 is connected to the terminal VPP. Also, the feeding switch 34 is supplied with a switch control bit stored in the register 32 from a control terminal. When the value of the switch control bit is 1, the feeding switch 34 is turned on. When the value of the switch control bit is 0, the feeding switch 34 is turned off.

<Flowchart when Writing Data>

Figure 4:
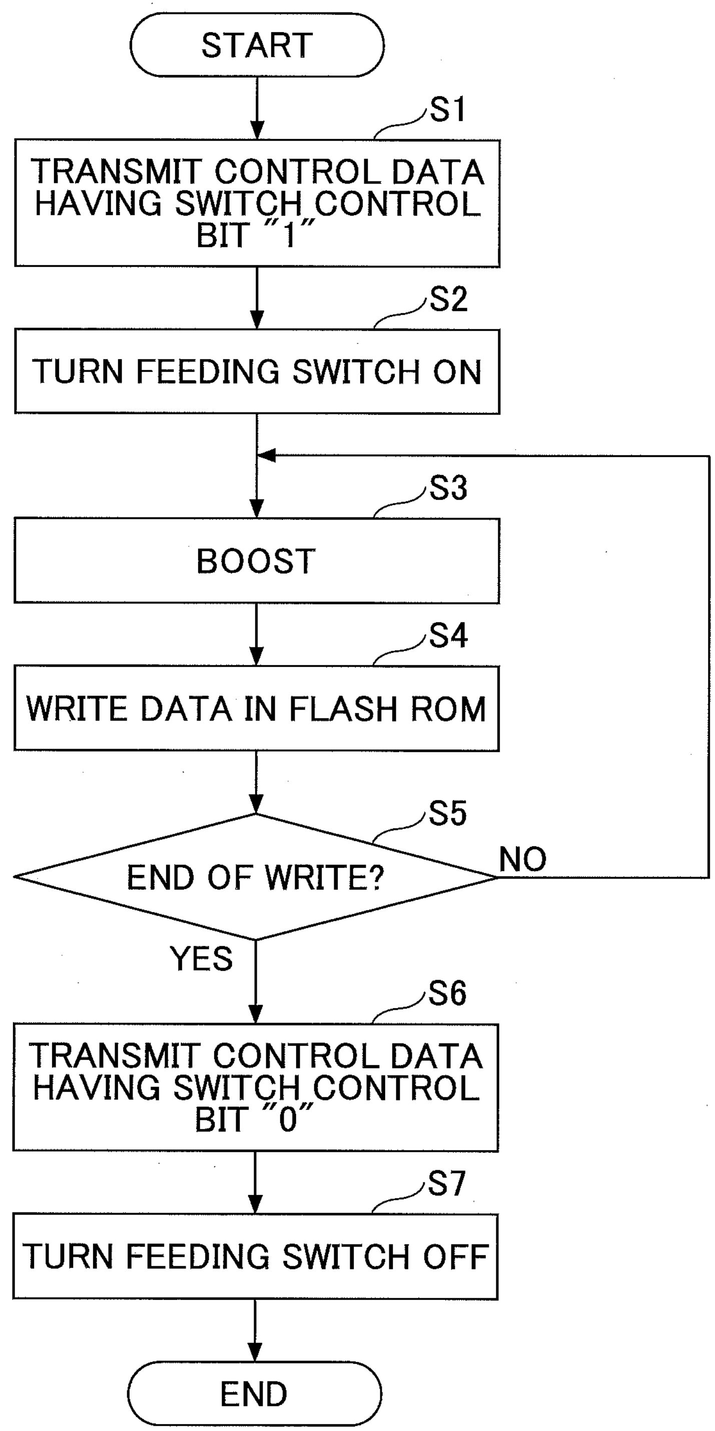
FIG. 4 is a flowchart of an embodiment for writing data into a flash ROM.

FIG. 4 shows a flowchart of an embodiment when writing data into the flash ROM 22. As shown in the figure, in step S1, the microcomputer 21 sends control data including the switch control bit of the value 1 to the protection IC 12 via the communication circuit 23, so that the control data including the switch control bit of the value 1 is written into the register 32 of the protection IC 12. Accordingly, the feeding switch 34 is turned on in step S2, so that the voltage (3.0 V~4.0 V, for example) of the secondary battery 10 is supplied to the terminal VPP of the battery monitor IC 11 from the terminal VPP of the protection IC 12.

In step S3, the booster circuit 24 of the battery monitor IC 11 boosts the voltage (3.0 V~4.0 V, for example) supplied from the terminal VPP into 5.0 V, and supplies the boosted voltage to the flash ROM 22. After that, in step S4, the microcomputer 21 writes data into the flash ROM 22.

In step S5, the microcomputer 21 determines whether data writing into the flash ROM 22 ends. When the data writing has not ended, the process goes to step S3. When data writing ends, the microcomputer 21 sends control data including the switch control bit of the value 0 to the protection IC 12 via the communication circuit 23, so that the control data including the switch control bit of the value 0 is written into the register 32 of the protection IC 12 in step S6. Accordingly, the feeding switch 34 is turned off in step S7 so that the terminal VPP of the protection IC 12 comes into a high-impedance status. In this status, since the power is not supplied to the booster circuit 24 from the terminal VPP, there is no power consumption in the booster circuit 24.

<Booster Circuit>

Figure 5:
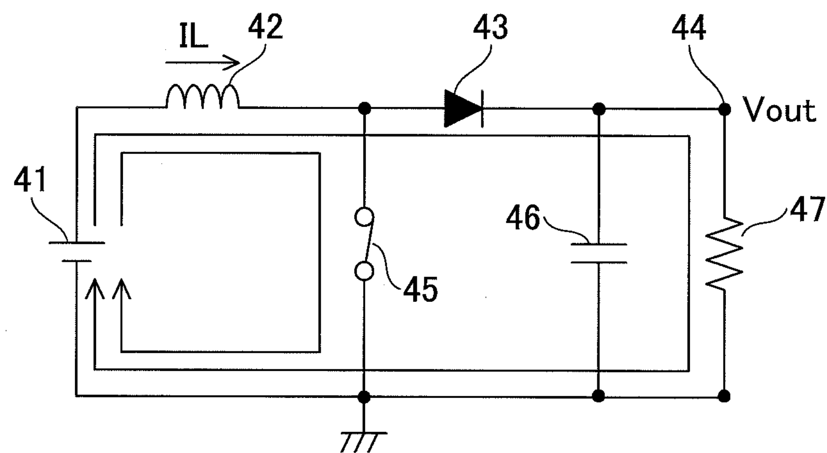
FIG. 5 is a circuit diagram of one stage of a booster part.

FIG. 5 is a circuit diagram of a booster part of one stage in the booster circuit 24. As shown in the figure, a positive electrode of the direct-current power supply 41 is connected to an output terminal 44 via an inductor 42 and a diode 43. Also, a negative electrode of the direct-current power supply 41 is connected to the ground or set to a voltage VSS. The connection point between the inductor 42 and the diode 43 is connected to the ground or set to the voltage VSS via a switch 45. The output terminal 44 is connected to the ground or set to the voltage VSS via a capacitor 46.

When the switch 45 is turned on, a current IL flows through the inductor 42, and when the switch is turned off, electromotive force occurs in the inductor 42, so that the capacitor 46 is charged and boosted via the diode 43 with the electromotive force and the voltage of the direct-current power source 41.

Figure 6:
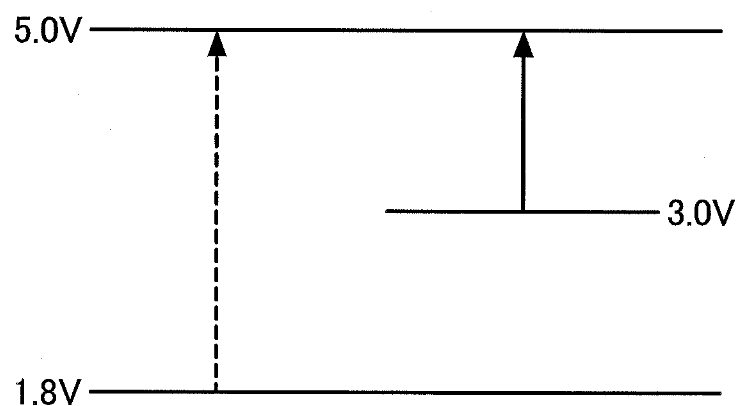
FIG. 6 is a diagram for explaining the present embodiment.

The booster circuit 24 is formed by cascading multi-stages of booster parts one of which is shown in FIG. 5. Since the booster circuit shown in FIG. 1 boosts the voltage of 1.8 V to the voltage of 5.0 V as shown by a dashed arrow in FIG. 6, the number of stages of booster parts increases so that the chip area increases. On the other hand, in the present embodiment, as shown by a solid arrow, since the voltage of 3.0 V (~4.0 V) is boosted to the voltage of 5.0 V, the number of stages of the booster parts can be decreased, so that the chip area can be decreased to about a half of that of the related technique shown in FIG. 1.

In the following, the reason for providing the feeding switch 34 in the protection IC 12 is described. In a configuration in which a feeding switch is provided in the battery monitor IC 11, and one end of the feeding switch is connected to the resistor R3 and another end is connected to the booster circuit 24, the battery monitor IC 11 may be broken in the case when the secondary battery 10 outputs an abnormally high voltage. On the other hand, according to the present embodiment, since the feeding switch 34 is provided in the protection IC 12 having high withstand voltage, the battery monitor IC 11 and the protection IC 12 can be prevented from being broken even when the secondary battery 10 outputs an abnormally high voltage.

The present invention is not limited to the specifically disclosed embodiments, and variations and modifications may be made without departing from the scope of the present invention.

What is claimed is:

1. A composite device system comprising:

a first device including a nonvolatile memory that is rewritable; and a second device, connected to the first device, configured to supply a power to the first device, the second device comprising:

a power supply circuit configured to stabilize a first power supplied from an external part into a second power that is lower than the first power, and to supply the second power to the first device;

a communication circuit configured to receive control data sent from the first device; and a switch configured to switch between on and off based on the control data, and to supply the first power supplied from the external part to the first device when the switch is on, wherein the second device receives the control data from the first device by the communication circuit when data is written into the nonvolatile memory so that the switch is turned on and the first power is supplied to the first device, and wherein the switch is turned off and power supply to the first device from the switch is stopped when the writing of the data is completed.

2. The composite device system as claimed in claim 1, the first device comprising:

a microcomputer configured to write data into the nonvolatile memory;

a communication circuit configured to send control data output by the microcomputer to the second device; and a booster circuit configured to boost the first power supplied from the switch of the second device so as to supply the boosted first power to the nonvolatile memory.

3. The composite device system as claimed in claim 2, wherein the first device is an integrated circuit configured to monitor a battery remaining amount of a secondary battery; and the second device is an integrated circuit configured to protect the secondary battery from over-charging and over-discharging.

* * * * *